Dec. 16, 1941.  E. F. BACON  2,266,298
GASOLINE TANK UNIT
Filed Oct. 5, 1939  2 Sheets-Sheet 2

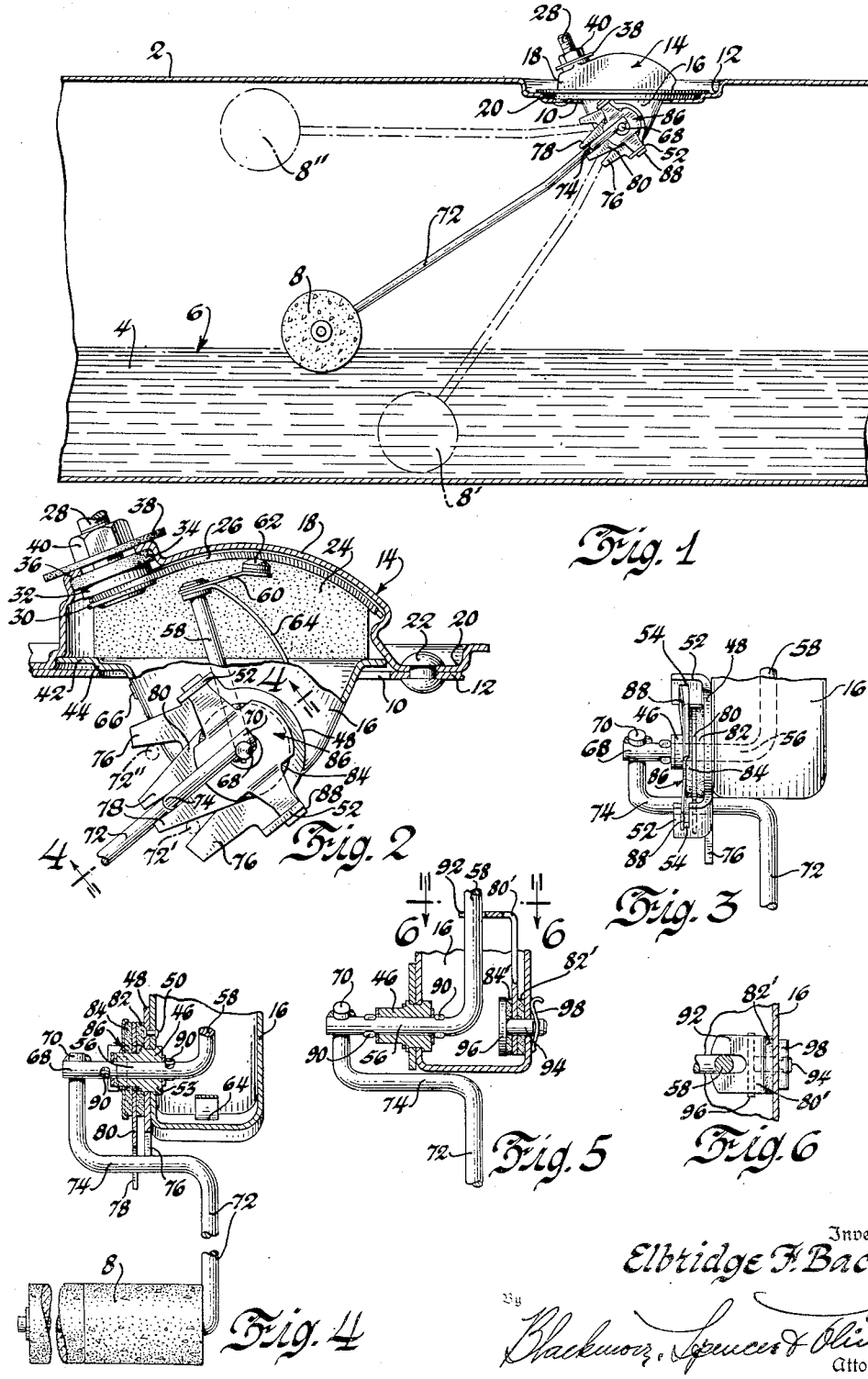

Inventor
Elbridge F. Bacon
By Blackmore, Spencer & Huck
Attorneys

Patented Dec. 16, 1941

2,266,298

UNITED STATES PATENT OFFICE 2,266,298

GASOLINE TANK UNIT

Elbridge F. Bacon, Flint, Mich., assignor to General Motors Corporation, Detroit, Mich., a corporation of Delaware Application October 5, 1939, Serial No. 297,985

8 Claims. (Cl. 201—48)

This invention relates to electric telemetric liquid level gages and has particular reference to the unit installed at the tank or reservoir containing the liquid the level of which is to be determined. Specifically, the gage is intended for adaptation to the fuel tank of an automotive vehicle.

The structure of the invention is adaptable for use with the galvanometer of the Bacon Patent 1,791,786.

The novelty of the invention relates to improvements in details of construction.

On the drawings:

Figure 1 is a sectional view through the fuel tank of an automotive vehicle showing the structure of the invention in applied position. The dotted line position of the float shows the two extreme positions.

Figure 2 is an enlarged sectional detailed view through the tank unit.

Figure 3 is a detailed view of the lower part of Figure 2 looking from the right.

Figure 4 is a sectional detailed view on the line 4—4 of Figure 2.

Figure 5 is a view corresponding to Figure 4 of a modification.

Figure 6 is a sectional detailed view on the line 6—6 of Figure 5.

Figure 7:
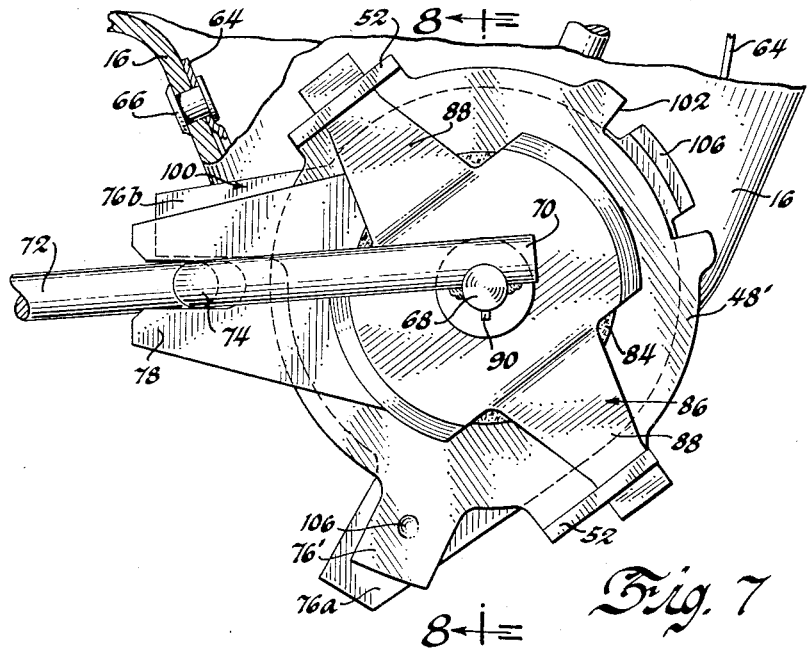
Figure 7 is a view similar to Figure 2 showing a calibrating washer.

Referring to the drawings, the numeral 2 indicates the tank or reservoir for containing fuel. The liquid is indicated at 4, and 6 indicates the level thereof. The float 8 is shown as floating on top of the liquid and the dotted line positions 8' and 8" of the float indicate the two extreme positions at the bottom and top of the tank respectively. The position 8' indicates the tank empty position and the position 8" the tank full position. The tank has an opening 10 in its top and the metal around the opening is depressed as indicated at 12. Over the opening and at the flange of the depressed part the unit 14 of the invention is mounted. The foregoing structure is in general conventional, and per se forms no part of the invention.

The tank unit comprises the lower cup part 16 and the upper or cover part 18. The cover part 18 has the lateral flange 20 which conforms to the shape of the depressed part 12 and fits thereover. The cover is secured in place by means of the rivets 22. At each end of the cover there is secured the insulating material 24 and at the top inner part of the cover the electrical resistance 26 is secured. The resistance is secured in place by means of a terminal bolt 28 having the head 30 against which one end of the resistance 26 abuts. A metal washer 32 is positioned over the bolt 28 at the other side of the resistance and the insulating washer 34 fits over the bolt next to the metal washer 32. The insulating washer 34 fits into the cup-shaped part 36 formed in the cover 18 and a second insulating washer 38 is positioned over the outside of the cup-shaped part 36. A nut 40 rigidly holds the parts in position. The bolt 28 passes through an oversized opening in the bottom of the cup-shaped part 36 and does not make contact with the cover 18.

The cup 16 has a laterally extending flange 42 provided with a shoulder 44 and the shoulder 44 is adapted to fit on the edge of the opening 10 as shown at the left hand part of Figure 2. Part 16 is more or less trough-shaped and the side thereof adjacent the bottom is provided with an opening in which a bearing 46 is secured. The outside of part 16 at the bearing 46 has a bracket 48 secured thereto by means of the rivets 50 and has an opening corresponding to the opening in the part 16. This opening serves as an additional means to mount the bearing 46. The bracket 48 has the end upturned ears 52 and each ear is provided with a slot 54.

The bearing 46 has an enlarged head 53 which fits against the inside of part 16, and the outer part of the bearing immediately adjacent the bracket 48 has a shoulder which holds the bearing against the bracket 48.

The bearing has a bore to receive the shaft part 56 of a movable arm 58. The top of the arm 58 has secured thereto the spring element 60 which has on its end the contact 62 which moves across and in contact with the resistance 26. A second spring element or arm 64 is secured to the end of the arm 58 and to the spring 60 and serves as a lead to conduct the electric current. The end of the arm 64 is secured as at 66 to the element 16.

The end 68 of the shaft 56 has the end 70 of the float arm 72 secured thereto as by welding. The float arm 72 is cranked as indicated at 74, the crank 74 extending between the forks 76, forming an integral part of bracket 48. The forks 76 limit the movement of the float 8 and float arm 72 to the extreme positions. The dotted line positions 72' and 72" in Figure 2 correspond respectively to the float positions 8' and 8" in Figure 1.

The crank part 74 of the float arm 72 also extends between the forks 78 of a metal friction member 80. This element 80 has an opening which fits around the bearing 46. At each side of the metal friction arm 80 the fabric friction members 82 and 84 are positioned and over the friction member 84 the metallic spring member 86 is positioned. This member 86 has the enlarged central part provided with outwardly projecting ears 88 as indicated in Figure 2. These ears 88 are received in the slots 54 as best shown in Figures 2 and 3. The member 86 is made of spring metal and the ears 88 must be depressed in order that they may be received in the slots 54. When depressed they are under tension and the central part 86 tightly presses the friction elements 80, 82, and 84 together to cause friction and prevent undue movements of the float due to sudden changes in liquid level, such as when the vehicle is passing over a bumpy road and the gasoline in the fuel tank sloshes from side to side. The shaft part 56 of the arm 58 has the pressed out parts 90 which hold the shaft in the bearing 46.

In Figure 5 the structure of the arm 58, bearing 46, shaft part 56, float arm 72 and crank 74 are the same as in the species of Figures 2, 3, and 4. The difference resides in the fact that the friction element is positioned at the other side of the cup 16. The friction element comprises the metal friction arm 80' which is forked at its upper extremity as indicated at 92, the fork fitting over the arm 58 to cause the friction element 80' to move with the arm. The lower end of the friction element 80' is provided with an opening through which there passes the rivet-like element 94. The rivet-like element 94 has the head 96, and friction element 82' and 84" are positioned on opposite sides of the metal friction element 80'. The end of the rivet 94 is provided with lateral slots and a spring 98 having a forked end is slipped into the slots and tightly holds the head 96 against the friction elements to increase friction.

The operation of the device is as follows: When the level of the liquid in the reservoir 2 changes, the float 8 will move therewith. This movement of the float 8 will move the float arm 72, the shaft 56, and contact arm 58, to cause the contact 62 to move over the resistance 26, to place more or less resistance in the circuit depending on the direction of movement of the float. The position of the contact 62 on the resistance 26 will be indicated by the galvanometer of the Bacon Patent 1,791,786. This reading on the galvanometer will indirectly indicate the position of the float and by graduating the dial of the galvanometer to read in gallons, the amount of fuel in the tank can be read directly.

Figure 8:
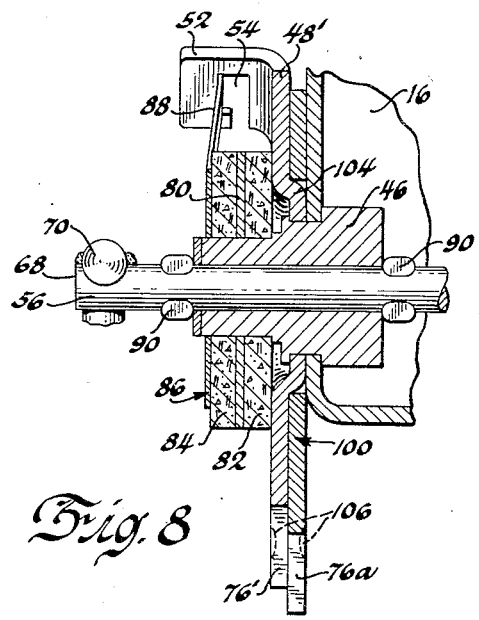
Figure 8 is a section on the line 8—8 of Figure 7.

In the species of Figures 7 and 8, the structure is the same as shown in the species of Figures 1 to 4 except that the bracket 48' of Figures 7 and 8 has a different shape than the bracket 48 of Figures 1 to 4 and a calibrating or adjusting washer 100 has been added. The bracket 48' has but a single tine 76', is provided with a recess 102, and is dished at its center as shown at 104. The recess 102 is substantially opposite the tine 76' and the adjusting or calibrating washer 100 has a central opening in which the dished part 104 is received. The washer 100 has a bent tongue 106, smaller than the recess 102 and is received therein, and the adjusting or calibrating movement of the washer relative to the bracket 48' is limited by the ends of the recess 102. The washer 100 has two tines 76a and 76b which correspond to the two tines 76 of the bracket 48 of Figures 1–4. The tine 76a overlaps the tine 76' of the bracket 48'.

When the parts are assembled, it has been found that the contact 62 is not positioned accurately enough on the resistance 26 to give an accurate reading on the differential galvanometer mounted at the instrument board of an automotive vehicle. In order more closely and accurately to position the contact 62 on the resistance it has been the practice to bend the float arm 72 at a suitable place in order to move the contact 62 nearer its extreme position. With the structure of Figures 7 and 8 this bending of the float arm is unnecessary because there is sufficient movement between the calibrating or adjusting washer 100 and the bracket 48' to enable accurate adjustment of the contact 62. When the contact has been properly positioned relative to the resistance 26, the tines 76' and 76a are welded together as indicated at 106 permanently to hold the parts in adjusted relation.

I claim:

1. In a tank unit of an electric liquid level telemetric system, a cup fitting over an opening in the tank, a bearing mounted in said cup, a shaft journally mounted in said bearing, a float connected to one end of said shaft and capable of turning said shaft in response to changes in the level of the liquid in the tank, friction resistance elements surrounding the bearing and shaft, and means connected to the cup and bearing against the resistance elements to increase friction and prevent excessive oscillations of the shaft due to sudden changes in the liquid level.

2. In a tank unit of an electric liquid level telemetric system, a cup fitting over an opening in the tank, a bearing mounted in said cup, a shaft journaled in said bearing, a float connected to one end of said shaft and capable of turning said shaft in response to changes in the level of the liquid in the tank, friction resistance elements surrounding the bearing and shaft, means connected to the cup and bearing against the friction elements to increase friction and prevent excessive oscillations of the shaft due to sudden changes in the liquid level, and means secured to the exterior of the housing to limit the movement of the shaft and the float.

3. In a tank unit of an electric liquid level telemetric system, a cup fitting over an opening in the tank, a bearing mounted in said cup, a shaft journaled in said bearing, a float connected to one end of said shaft and capable of turning said shaft in response to changes in the level of the liquid in the tank, friction resistance elements surrounding the bearing and shaft, means connected to the cup and bearing against the friction elements to increase friction and prevent excessive oscillations of the shaft due to sudden changes in the liquid level, a contact on the end of the shaft, and a spring between the end of the shaft and the cup to form an electrical circuit.

4. In a tank unit of an electric liquid level telemetric system, a cup fitting over an opening in the tank, a bracket secured to the cup, a bearing mounted in the bracket and cup, a shaft journaled in the bearing, a float connected to one end of said shaft and capable of turning said shaft in response to changes in the level of the liquid in the tank, friction resistance elements surrounding the bearing and shaft, one side of said friction elements being in contact with the bracket, and a spring secured to the bracket and pressing against the friction elements to produce friction to prevent excessive oscillations of the shaft due to sudden changes in liquid level.

5. In a tank unit of an electric liquid level telemetric system, a cup fitting over an opening in the tank, a bracket secured to the cup, a bearing mounted in the bracket and cup, a shaft journaled in the bearing, a float connected to one end of said shaft and capable of turning said shaft in response to changes in the level of the liquid in the tank, friction resistance elements surrounding the bearing and shaft, one side of said friction elements being in contact with the bracket, a spring secured to the bracket and pressing against the friction elements to produce friction to prevent excessive oscillations of the shaft due to sudden changes in liquid level, and means on the bracket to limit the movement of the shaft and float.

6. In a tank unit for an electric telemetric liquid level gage, a cup seated over an opening in the tank, a shaft journaled in the cup and having a float connected thereto, said float turning said shaft in response to changes in liquid level in the tank, a bracket secured to the cup, ears on the bracket, friction elements surrounding the shaft, one of said friction elements being stationary and the other element being movable with the connection between the float and the shaft, and means secured in place by the ears and causing pressure to be exerted on the friction elements to produce friction therebetween and to prevent excessive sudden movements of the float and shaft.

7. In a tank unit for an electric telemetric liquid level gage, a cup fitted over an opening in the tank, a shaft journaled in the cup and having a float connected thereto, said float turning said shaft in response to changes in liquid level, friction elements secured to the cup in alignment with the shaft, and one of said friction elements being immovably secured to the cup, means connecting the shaft to the other of the friction elements to cause the element to be moved with the shaft, and means to press the friction elements together to produce friction therebetween and to prevent excessive sudden movement of the shaft and float.

8. In a tank unit for an electric telemetric liquid level gage, a cup fitted over an opening in the tank, a shaft journaled in the cup and having a float arm connected thereto, a float on said arm, a resistance, an arm on the shaft, a contact on said last named arm capable of moving over the resistance in response to movements of the float, a bracket mounted rigidly relative to the cup, a calibrating washer mounted between the bracket and the cup, tines on the washer, the float arm extending between said tines and said tines limiting the movement of the float arm, said washer capable of movement relative to the bracket and cup to change the position of the tines to enable the adjustment of the shaft, the movement of said washer also enabling the adjustment of the contact relative to the resistance, said washer being rigidly secured to the bracket when the parts are in adjusted position.

ELBRIDGE F. BACON.